US012784144B2

(12) United States Patent
Cheng

(10) Patent No.: US 12,784,144 B2
(45) Date of Patent: Nov. 3, 2026

(54) STROBOSCOPIC IMAGE PROCESSING METHOD AND APPARATUS, ELECTRONIC DEVICE, AND READABLE STORAGE MEDIUM

(71) Applicant: VIVO MOBILE COMMUNICATION CO., LTD., Guangdong (CN)

(72) Inventor: Lin Cheng, Guangdong (CN)

(73) Assignee: Vivo Mobile Communication Co., Ltd., Dongguan (CN)

( * ) Notice: Subject to any disclaimer, the term of this patent is extended or adjusted under 35 U.S.C. 154(b) by 158 days.

(21) Appl. No.: 19/004,197

(22) Filed: Dec. 27, 2024

(65) Prior Publication Data

US 2025/0139741 A1 May 1, 2025

Related U.S. Application Data

(63) Continuation of application No. PCT/CN2023/103904, filed on Jun. 29, 2023.

(30) Foreign Application Priority Data

Jul. 6, 2022 (CN) ......................... 202210796573.4

(51) Int. Cl.
*G06T 5/70* (2024.01)
*G06T 5/20* (2006.01)
(Continued)

(52) U.S. Cl.
CPC .................. *G06T 5/50* (2013.01); *G06T 5/20* (2013.01); *G06T 5/70* (2024.01); *G06V 10/60* (2022.01);
(Continued)

(58) Field of Classification Search
CPC ............................................... H04N 23/70–76
See application file for complete search history.

(56) References Cited

U.S. PATENT DOCUMENTS

2003/0030744 A1 2/2003 Baer
2005/0063605 A1 3/2005 Huang et al.
(Continued)

FOREIGN PATENT DOCUMENTS

CN 1946143 A 4/2007
CN 111383196 A 7/2020
(Continued)

OTHER PUBLICATIONS

International Search Report and Written Opinion with English translation, Int. Application No. PCT/CN2023/103904, Int. Filing Date: Jun. 29, 2023, Applicant: Vivo Mobile Communication Co., Ltd., Dated: Oct. 19, 2023.
(Continued)

*Primary Examiner* — Ryan Mcculley
(74) *Attorney, Agent, or Firm* — Reising Ethington P.C.

(57) ABSTRACT

This application discloses a stroboscopic image processing method and apparatus, an electronic device, and a readable storage medium. The method includes: obtaining a first image photographed under a stroboscopic light source, where the first image is a raw RAW domain image; performing high-frequency image and low-frequency image separation on the first image, to obtain a first high-frequency image and a first low-frequency image; determining a target mask based on the first low-frequency image, where a mask value in the target mask is negatively correlated with brightness and banding strength of a region corresponding to the mask value in the first low-frequency image; filtering banding in the first low-frequency image based on the target mask, to obtain a second low-frequency image; and superposing the second low-frequency image and the first high-frequency image, to obtain an output image.

20 Claims, 6 Drawing Sheets

(51) Int. Cl.
*G06T 5/50* (2006.01)
*G06V 10/60* (2022.01)
*H04N 23/61* (2023.01)
*H04N 23/745* (2023.01)

(52) U.S. Cl.
CPC ........... *H04N 23/61* (2023.01); *H04N 23/745* (2023.01); *G06T 2207/20221* (2013.01)

(56) References Cited

U.S. PATENT DOCUMENTS

| | | | | |
|---|---|---|---|---|
| 2010/0046804 | A1* | 2/2010 | Gu | H04N 19/90 382/190 |
| 2015/0103209 | A1 | 4/2015 | Elhachimi et al. | |
| 2016/0307298 | A1* | 10/2016 | Chou | G06T 3/4007 |
| 2016/0307302 | A1* | 10/2016 | Chou | G06T 5/20 |
| 2021/0400171 | A1 | 12/2021 | Zhao et al. | |
| 2023/0276136 | A1 | 8/2023 | Cui et al. | |

FOREIGN PATENT DOCUMENTS

| | | | |
|---|---|---|---|
| CN | 112738414 | A | 4/2021 |
| CN | 113840090 | A | 12/2021 |
| CN | 115082350 | A | 9/2022 |

OTHER PUBLICATIONS

European Search Report, Reference: 27.D8277.12.EP.588W, Application No. 23834715.7-1207 / U.S. Pat. No. 4,553,755 PCT/CN2023103904, Dated: Sep. 8, 2025.

* cited by examiner

STROBOSCOPIC IMAGE PROCESSING METHOD AND APPARATUS, ELECTRONIC DEVICE, AND READABLE STORAGE MEDIUM

CROSS-REFERENCE TO RELATED APPLICATIONS

This application is a Bypass Continuation Application of PCT International Application No. PCT/CN2023/103904 filed on Jun. 29, 2023, which claims priority to Chinese Patent Application No. 202210796573.4, filed on Jul. 6, 2022 in China, which is incorporated herein by reference in its entirety.

TECHNICAL FIELD

This application pertains to the field of image processing technologies, and in particular, to a stroboscopic image processing method and apparatus, an electronic device, and a readable storage medium.

BACKGROUND

In the related art, it is likely to photograph a stroboscopic picture in a photographing environment affected by stroboscopic lighting, that is, black and white stripes appear in the picture.

To overcome this problem, in the related art, a flash frequency of the current stroboscopic lighting can be estimated by hardware, and a shutter time is set to be 1 or 2 times of a stroboscopic cycle, to avoid a banding phenomenon in the photographed picture.

However, when a moving object is photographed, definition of a photographed image needs to be improved by increasing a shutter speed, while the shutter time used to overcome the banding phenomenon in the photographed picture cannot meet a shutter time for photographing the moving object. When a moving speed of the moving object is too fast, the moving object in the image may be blurred, and a requirement of photographing a fast moving object clearly cannot be met.

In addition, in the related art, a raw image file (RAW) domain image processing scheme of deep learning may be used to perform banding removal for the whole image, in which banding removal is performed on the whole image. However, a noise in a banding stripe region is large due to dark brightness. If banding removal is performed on the whole image, it is likely to cause noise exposure in the dark brightness region and loss of raw image quality after banding removal.

In conclusion, performance of a debanding method in the related art is poor.

SUMMARY

According to a first aspect, an embodiment of this application provides a stroboscopic image processing method, and the method includes:

- obtaining a first image photographed under a stroboscopic light source, where the first image includes banding, and the first image is a raw RAW domain image;
- performing high-frequency image and low-frequency image separation on the first image, to obtain a first high-frequency image and a first low-frequency image;
- determining a target mask based on the first low-frequency image, where a mask value in the target mask is negatively correlated with brightness and banding strength of a region corresponding to the mask value in the first low-frequency image;
- filtering banding in the first low-frequency image based on the target mask, to obtain a second low-frequency image, where a RAW domain value located in a first region of the second low-frequency image is greater than a RAW domain value located in a second region of the first low-frequency image, the first region includes a region in which banding is located and does not include a region in which a dark region is located, the dark region is a region with a brightness value less than a preset brightness threshold, and the first region corresponds to the second region; and
- superposing the second low-frequency image and the first high-frequency image, to obtain an output image.

According to a second aspect, an embodiment of this application provides a stroboscopic image processing apparatus, and the apparatus includes:

- an obtaining module, configured to obtain a first image photographed under a stroboscopic light source, where the first image includes banding, and the first image is a raw RAW domain image;
- a first processing module, configured to perform high-frequency image and low-frequency image separation on the first image, to obtain a first high-frequency image and a first low-frequency image;
- a determining module, configured to determine a target mask based on the first low-frequency image, where a mask value in the target mask is negatively correlated with brightness and banding strength of a region corresponding to the mask value in the first low-frequency image;
- a second processing module, configured to filter banding in the first low-frequency image based on the target mask, to obtain a second low-frequency image, where a RAW domain value located in a first region of the second low-frequency image is greater than a RAW domain value located in a second region of the first low-frequency image, the first region includes a region in which banding is located and does not include a region in which a dark region is located, the dark region is a region with a brightness value less than a preset brightness threshold, and the first region corresponds to the second region; and
- a third processing module, configured to superpose the second low-frequency image and the first high-frequency image, to obtain an output image.

According to a third aspect, an embodiment of this application provides an electronic device. The electronic device includes a processor and a memory, the memory stores a program or an instruction that can be run on the processor, and the program or the instruction is executed by the processor to implement the steps of the method according to the first aspect.

According to a fourth aspect, an embodiment of this application provides a readable storage medium. The readable storage medium stores a program or an instruction, and the program or the instruction is executed by a processor to implement the steps of the method according to the first aspect.

According to a fifth aspect, an embodiment of this application provides a chip. The chip includes a processor and a communication interface, the communication interface is coupled to the processor, and the processor is configured to run a program or an instruction to implement the method according to the first aspect.

According to a sixth aspect, an embodiment of this application provides a computer program product. The program product is stored in a storage medium, and the program product is executed by at least one processor to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill based on the embodiments of this application shall fall within the protection scope of this application.

In the specification and claims of this application, the terms such as “first” and “second” are used for distinguishing similar objects, and are not necessarily used to describe a particular order or sequence. It should be understood that terms used in such a way are interchangeable in proper circumstances, so that embodiments of this application can be implemented in an order other than the order illustrated or described herein. Objects classified by “first”, “second”, and the like are usually of a same type, and a quantity of objects is not limited. For example, there may be one or more first objects. In addition, in this specification and the claims, “and/or” indicates at least one of connected objects, and a character “/” generally indicates an “or” relationship between associated objects.

The following specifically describes a stroboscopic image processing method and apparatus, an electronic device, and a readable storage medium provided in the embodiments of this application through specific embodiments and application scenarios thereof with reference to the accompanying drawings.

Figure 1:
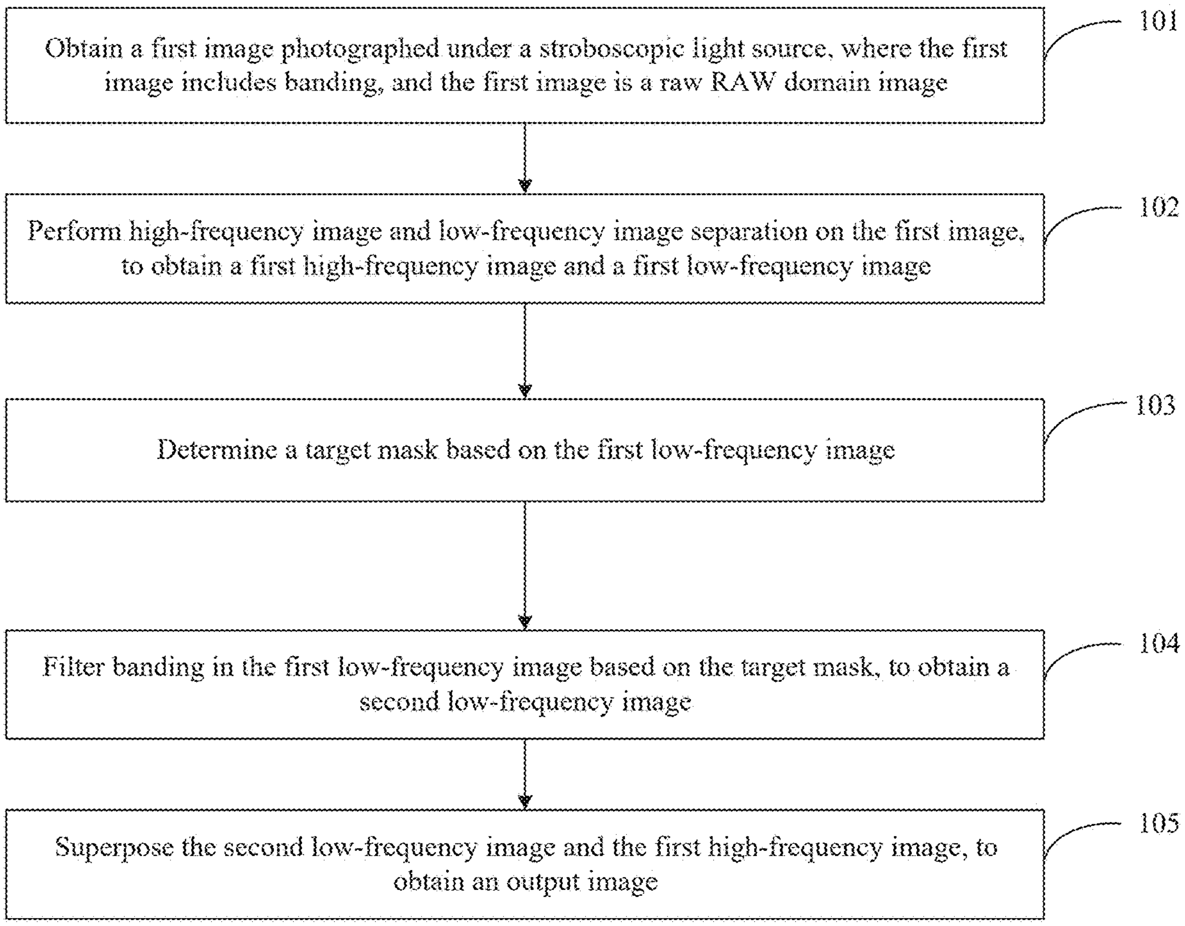
FIG. 1 is a flowchart of a stroboscopic image processing method according to an embodiment of this application.

Refer to FIG. 1, the stroboscopic image processing method provided in this embodiment of this application may be executed by an electronic device, for example, a mobile phone or a camera, or may be executed by a tablet computer, a notebook computer, a palmtop computer, an in-vehicle electronic device, a mobile Internet device (MID), an augmented reality (AR)/virtual reality (VR) device, a robot, a wearable device, an ultra-mobile personal computer (UMPC), a netbook, a personal digital assistant (PDA), or the like. The electronic device may be alternatively a server, a network attached storage (NAS), a personal computer (PC), a television (TV), a teller machine, a self-service machine, or the like. This is not specifically limited in this embodiment of this application.

As shown in FIG. 1, the stroboscopic image processing method provided in this embodiment of this application may include the following steps.

Step 101: Obtain a first image photographed under a stroboscopic light source, where the first image includes banding, and the first image is a raw RAW domain image.

In this embodiment, the first image may include one image or at least two images. In a case that the first image includes at least two images, at least one of the two images is an image with banding, and the banding needs to be removed. In a case that the first image includes one image, the image is an image with banding, and the stroboscopic image processing method provided in this embodiment of this application is used to remove the banding in the image.

Step 102: Perform high-frequency image and low-frequency image separation on the first image, to obtain a first high-frequency image and a first low-frequency image.

The first low-frequency image may be understood as a part of image content with lower definition in the first image, and the first high-frequency image may be a part of the image content with higher definition in the first image.

Optionally, the performing high-frequency image and low-frequency image separation on the first image, to obtain a first high-frequency image and a first low-frequency image includes:

- performing mean filtering processing on the first image, to obtain the first low-frequency image; and
- performing image removal processing on the first image based on the first low-frequency image, to obtain the first high-frequency image.

In this implementation, the first low-frequency image is obtained by performing mean filtering on the first image (a RAW domain image), for example, mean filtering is performed on the first image with a kernel size of 5×5, to obtain the first low-frequency image, where the first low-frequency image may be a single-channel image in a RAW domain. The first high-frequency image is a RAW domain image obtained by subtracting the first low-frequency image from the first image.

During implementation, a ratio of a length to a width of the first low-frequency image or the first high-frequency image may be 1:1, 1:2, 2:1, or the like, which is not specifically limited herein.

Step 103: Determine a target mask based on the first low-frequency image, where a mask value in the target mask is negatively correlated with brightness and banding strength of a region corresponding to the mask value in the first low-frequency image.

During implementation, a dimension of the target mask may be the same as a dimension of the first low-frequency image, and each mask value in the target mask may correspond to a pixel in the first low-frequency image. In this case, the mask value in the target mask for a region corresponding to the mask value in the first low-frequency image may be a pixel that is in the first low-frequency image and that is corresponding to the mask value in the target mask.

Certainly, the dimension of the target mask may also be different from the dimension of the first low-frequency image. In this case, the mask value in the target mask for the region corresponding to the mask value in the first low-frequency image may be at least one pixel or a part of a pixel in the first low-frequency image corresponding to the mask value in the target mask, which is not specifically limited herein.

In an implementation, an image without banding can be obtained by photographing based on a shutter frequency corresponding to a flash frequency of the stroboscopic light source, and then the image is compared with an image with banding, to obtain a banding region and banding strength corresponding to each pixel position in the banding region. In addition, a dark region (that is, a region with brightness less than or equal to a preset brightness threshold) in the first low-frequency image and brightness corresponding to each pixel position in the dark region can be determined based on a black level value in the first low-frequency image. In this way, the target mask can be determined based on both the dark region and the banding region, so that the mask value in the target mask is negatively correlated with brightness and banding strength of a corresponding region. Therefore, in a process of debanding by using the target mask, adaptive noise reduction and a reduced degree of debanding in the dark region can be achieved, which improves image quality obtained after processing and avoids the problem of excessive stroboscopic removal.

Certainly, in practical application, the banding region and/or the dark region in the image with banding can also be obtained in other manners, for example, the banding region and/or the dark region in the image with banding can be obtained through analysis by using an artificial intelligence (AI) network model, which is not specifically limited herein.

Step 104: Filter banding in the first low-frequency image based on the target mask, to obtain a second low-frequency image, where a RAW domain value located in a first region of the second low-frequency image is greater than a RAW domain value located in a second region of the first low-frequency image, the first region includes a region in which banding is located and does not include a region in which a dark region is located, the dark region is a region with a brightness value less than a preset brightness threshold, and the first region corresponds to the second region.

During implementation, the first region may be a banding region in the second low-frequency image, and the second region may be a banding region in the first low-frequency image. That the first region corresponds to the second region may be: in a case that the first low-frequency image and the second low-frequency image are the same in size, a position of the first region in the second low-frequency image is the same as a position of the second region in the first low-frequency image, for example, if the first low-frequency image and the second low-frequency image are superimposed, the first region overlaps the second region.

Step 105: Superpose the second low-frequency image and the first high-frequency image, to obtain an output image.

During implementation, after banding (a non-dark region) in the first low-frequency image is filtered by using the target mask, an obtained RAW domain value of a region where banding in the second low-frequency image other than the dark region is located is increased. In this way, when the second low-frequency image and the first high-frequency image are superimposed, a ratio of a RAW domain value of the first high-frequency image in the region where the banding other than the dark region is located can be reduced, more banding regions obtained after debanding in the second low-frequency image are reserved, and in the first high-frequency image, influence of banding on the output image is reduced. Therefore, the output image can retain high-frequency content in the first high-frequency image (for example, when a moving object needs to be photographed with a high frequency, definition of pixel content corresponding to the moving object in the output image can be improved through the first high-frequency image), and a ratio of a RAW domain value of the second low-frequency image in the debanding region can be improved, thus achieving debanding effect.

It is worth mentioning that the obtained output image may be a RAW domain image, or an image in other formats such as RGB. For example, it is assumed that a device implementing the stroboscopic image processing method provided in this embodiment of this application is a device with a photographing function such as a mobile phone, a camera, or the like, after the device superposes the second low-frequency image and the first high-frequency image, to obtain a RAW image with stroboscopic removal, the RAW image with stroboscopic removal may be returned to a camera link, and after the RAW image is converted into an RGB image through image signal processing (ISP) simulation, the RGB image is returned to a user through display or other manners.

In an optional implementation, the first image includes a first sub-image (for ease of description, the first sub-image is marked as input1 in the following embodiment) and a second sub-image (for ease of description, the second sub-image is marked as input2 in the following embodiment), the first sub-image is obtained through photographing based on a first shutter frequency, the second sub-image is obtained through photographing based on a second shutter frequency, the first shutter frequency is related to a moving speed of a photographed object, and the second shutter frequency is related to a flash frequency of the stroboscopic light source.

The second shutter frequency related to the flash frequency of the stroboscopic light source may be 1 or 2 times of the flash frequency, and in this way, the second sub-image may not have banding stripes.

In practical application, a flash frequency of light is usually 60 Hz or 50 Hz, and the second shutter frequency may be 1 or 2 times of 60 Hz or 50 Hz. For example, the flash frequency is 60 Hz, and a shutter speed corresponding to the second shutter frequency may be 1/120 (s) or 1/60 (s).

During implementation, the flash frequency of the light can be obtained by detection, receiving an instruction, or the like.

However, the second shutter frequency usually cannot meet a requirement of a fast moving object to be photographed. For example, when a moving speed of the moving object is too fast, the moving object may be blurred, and a requirement of photographing the fast moving object clearly cannot be met. Based on this, the first shutter frequency can be a shutter frequency that matches the moving speed of the photographed object, and based on this first shutter frequency, a moving photographed object can be clearly photographed, that is, the photographed object in the first sub-image is clear.

After the first sub-image and the second sub-image are obtained through photographing, high-frequency and low-frequency separation may be separately performed on the first sub-image and the second sub-image, and two low-frequency images separated from the first sub-image and the second sub-image are used to determine a target mask. Then, the target mask is used to perform debanding processing on the low-frequency image separated from the first sub-image, and a high-frequency image separated from the first sub-image (with a clear photographed object) is superimposed with the low-frequency image obtained after debanding, to obtain an output image.

In an optional implementation, the performing high-frequency image and low-frequency image separation on the first image, to obtain a first high-frequency image and a first low-frequency image includes:

performing high-frequency image and low-frequency image separation on the first sub-image (input1), to obtain a first high-frequency sub-image (for ease of description, the first high-frequency sub-image is marked as input1_g in the following embodiment) and a first low-frequency sub-image (for ease of description, the first low-frequency sub-image is marked as input1_d in the following embodiment); and performing high-frequency image and low-frequency image separation on the second sub-image (input2), to obtain a second high-frequency sub-image (for ease of description, the second high-frequency sub-image is marked as input2_g in the following embodiment) and a second low-frequency sub-image (for ease of description, the second low-frequency sub-image is marked as input2_d in the following embodiment), where the first high-frequency image includes the first high-frequency sub-image and the second high-frequency sub-image, and the first low-frequency image includes the first low-frequency sub-image and the second low-frequency sub-image.

Figure 2:
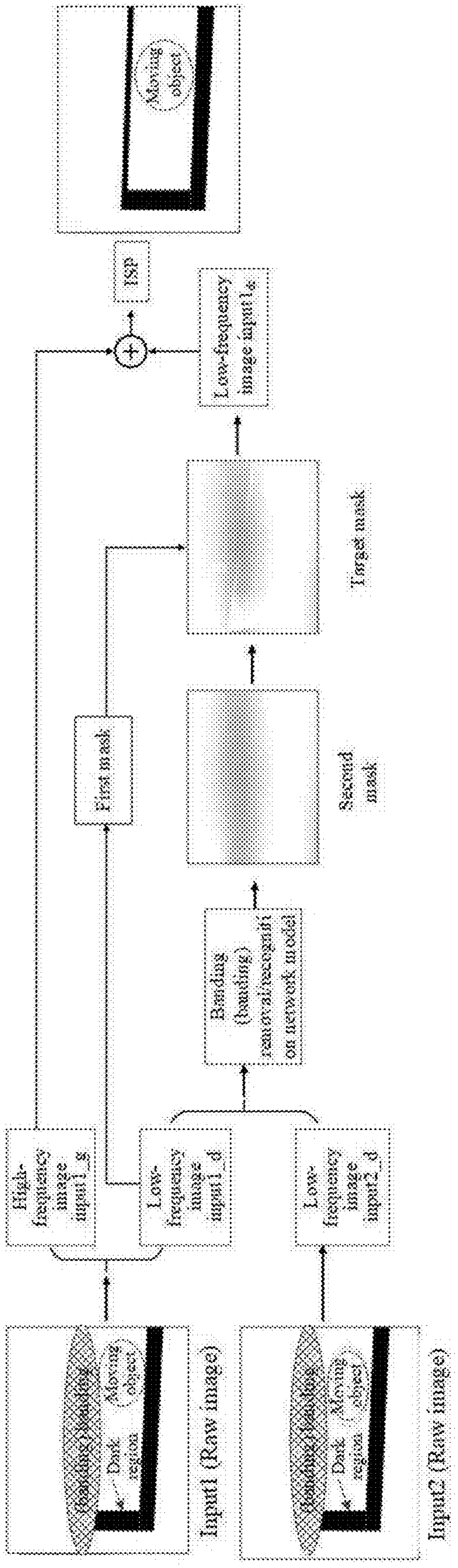
FIG. 2 is a schematic diagram of a data processing process of a stroboscopic image processing method according to an embodiment of this application.

In this implementation, the banding region can be obtained by comparing the second high-frequency sub-image without banding with the first low-frequency sub-image with banding. For example, as shown in FIG. 2, a data processing process in this embodiment of this application may include: determining a banding region mask based on input1_d and input2_d→determining a target mask based on a dark region mask of a dark region in input1_d and the banding region mask→performing debanding processing on input1_d by using the target mask→superimposing input1 g with input1_d obtained after debanding processing, to obtain an output image (hereinafter referred to as output).

Optionally, when a storage format of the first low-frequency image is GBRG, the determining the target mask based on the first low-frequency image includes:

determining, based on a RAW image obtained after four types of data (for example, GR, G, B, Gr) in the first low-frequency sub-image input1_d are stacked on channels, an average RAW image (for ease of description, the average RAW image is marked as input1_d_avg in the following embodiment) corresponding to the first low-frequency sub-image, where the average RAW image includes G channel data obtained after average value processing, B channel data obtained after average value processing, and R channel data obtained after average value processing, and the G channel data is determined based on an average value of Gr channel data and Gb channel data in the first low-frequency sub-image;

normalizing the average RAW image based on a black level value and a maximum number of bits of the average RAW image, to obtain a normalized RAW image (for ease of description, the normalized RAW image is marked as RAW image x in the following embodiment);

determining a first mask (for ease of description, the first mask is marked as z in the following embodiment) based on a region in which a pixel value in the normalized RAW image is less than or equal to a first preset threshold (for ease of description, the first preset threshold is marked as s in the following embodiment), where a smaller mask value in the first mask indicates lower brightness of a corresponding region;

splicing the first low-frequency sub-image and the second low-frequency sub-image on a channel, to obtain an intermediate image;

inputting the intermediate image into a preset banding recognition model, to obtain a second mask (for ease of description, the second mask is marked as mask in the following embodiment), where a smaller mask value in the second mask indicates heavier banding of a corresponding region; and adjusting the second mask based on the first mask, to obtain the target mask (for ease of description, the target mask is marked as mask, in the following embodiment).

Steps of determining the target mask based on the first low-frequency image may include the following processes.

Figure 3:
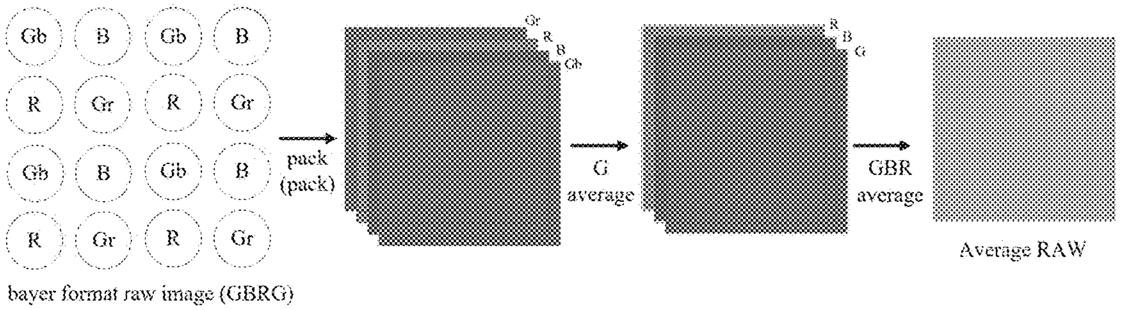
FIG. 3 is a schematic diagram of a processing process of an average RAW image.

1. Assume that a size of a RAW image of input1 and input2 is W×H. input1_d is a single channel image in the RAW domain, and may be in a specific Bayer format, which is assumed to be a GBRG format in this embodiment. As shown in FIG. 3, firstly, a pack operation is performed on the RAW image, and four different types of data (Gr, Gb, R, B) are stacked together on a channel, then the Gr channel and the Gb channel are averaged to obtain an average G channel, and finally, values of three channels, namely, GBR, are averaged to obtain an average RAW image (input1_d_avg), where a size of input1_d_avg is W/2×H/2.

2. Normalize the average RAW image, subtract the black level value of the RAW image, and then is divided by the maximum number of bits ($2^{bit}$) of the average RAW image, to obtain a normalized RAW image x with a value between 0 and 1.

3. Set a first preset threshold s for dark region suppression based on a requirement or a photographing scene, and calculate x as follows:

$$y = \text{clamp}\left(2^{\frac{x-s}{s}}, 0, 1\right)$$

x is the normalized image that is input, s is the first preset threshold (namely, a dark region suppression threshold), and clamp ( ) represents numerical truncation. Through calculation by using the above formula, the normalized RAW image can be truncated to 0-1. When a pixel value in x is greater than s, it indicates that current brightness at this position does not need to be suppressed, and is a normal brightness range; and when the pixel value in x is lower than s, it indicates that the position is in a dark region, and a removal degree needs to be reduced for subsequent banding removal in this region. In addition, brightness change is smooth and continuous, and a smaller value indicates a darker point.

Because a uniform transition range of a negative interval in an exponential function is very small, a numerical gradient interval and range can be expanded by finding an exponential value for many times, so that a final value of the first mask z ranges from 0 to 1. For example, the following formula can be used to find the exponent value repeatedly for n times, to get the first mask z:

$$z = \text{repeat}(2^y, n)$$

Figure 4:
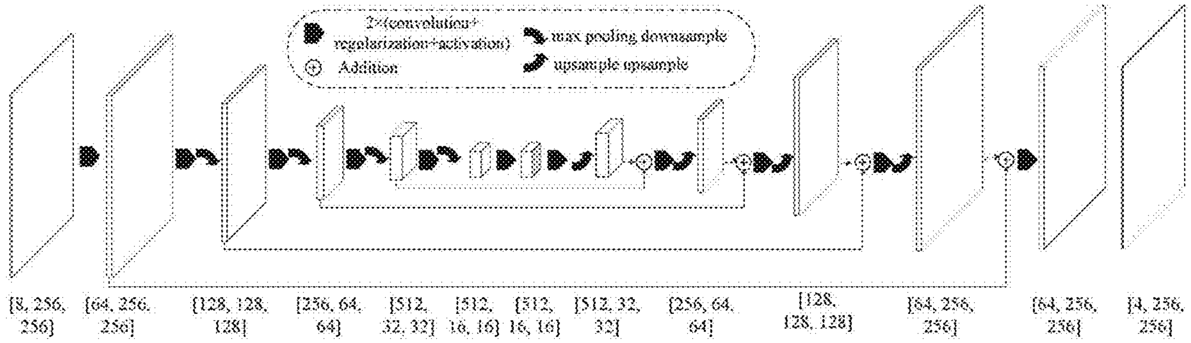
FIG. 4 is a schematic diagram of a structure of a preset banding recognition model.

4. Splice input1_d and input2_d on a channel after the pack operation, and input a preset banding recognition model after normalizing and resizing to the size of W×H, to obtain a second mask (a banding stripe mask) that is output by the preset banding recognition model. A model structure of the preset banding recognition model may be as shown in FIG. 4, and a size of the mask that is output by the preset banding recognition model may be W×H×4. A smaller mask value in the second mask indicates a higher banding degree of the position, and conversely, a larger mask value indicates a lower banding degree of the position. If the mask value is equal to 1, it indicates that there is no banding at this position. After that, the banding stripe mask may be resized to W/2×H/2×4.

5. Adjust, based on z, a dark region of the banding stripe mask obtained from the preset banding recognition model, to obtain a target mask $mask_z$. A smaller mask value in z (close to 0) indicates a darker point, and a larger mask value in z (close to 1) indicates a brighter point, while a smaller mask value in the mask (close to 0) indicates heavier banding at this position, and a larger mask value in the mask (close to 1) indicates a lighter degree.

Optionally, before the above process 5, RAW domain values of two G channels in the second mask can be averaged, so that relative proportions of Gr and Gb can be kept consistent, and a grid phenomenon in the RAW image can be avoided after banding is removed subsequently.

The determining a target mask based on the first low-frequency image further includes:

obtaining a first mask value corresponding to a Gr data channel in the second mask;

obtaining a second mask value corresponding to a Gb data channel in the second mask; and updating, based on an average value of the first mask value and the second mask value, the mask values corresponding to the Gr data channel and the Gb data channel in the second mask; and the adjusting the second mask based on the first mask, to obtain the target mask includes:

adjusting the updated second mask based on the first mask, to obtain the target mask.

For example, updating, by using the following formula, the mask values corresponding to the Gr data channel and the Gb data channel in the second mask:

$$\text{mask}[Gb] = \frac{\text{mask}[Gb] + \text{mask}[Gr]}{2}$$

$$\text{mask}[Gr] = \text{mask}[Gb]$$

mask [Gr] represents the first mask value, and mask [Gb] represents the second mask value.

In this implementation, RAW domain values of two G channels in the second mask can be averaged, to avoid a grid phenomenon in the RAW image after banding is removed subsequently.

Optionally, the adjusting the second mask based on the first mask, to obtain the target mask includes:

reducing, based on the first mask, a mask value corresponding to a target region in the second mask, to obtain the target mask, where a mask value corresponding to the target region in the first mask is less than or equal to a second preset threshold, and a mask value corresponding to the target region in the second mask is less than or equal to a third preset threshold.

For example, the following formula is used to determine the target mask $mask_z$:

$$\text{mask}_z = 1 - (1 - \text{mask}) \times z$$

In the above formula, the mask is inverted, multiplied by z, and then inverted, which is equivalent to: when it is in a banding region, and is located in a dark region, a mask value at this position may be reduced, while when it is located in a non-dark region, the mask remains the same as a mask value in the banding stripe mask.

After mask, is obtained, input1_d can be divided by mask, to obtain a second low-frequency image in which banding is removed (for ease of description, the second low-frequency image is marked as $input1_{dz}$ in the following embodiment). For example, $input1_{dz}$ can be determined by using the following formula:

$$\text{input1}_{dz} = \text{input1\_d} / \text{mask}_z$$

Because a mask value in $mask_z$ is between 0 and 1, based on the above formula, a pixel value of a banding region in $input1_{dz}$ can be enlarged.

In this case, the superposing the second low-frequency image and the first high-frequency image, to obtain an output image may be expressed as the following formula:

$$\text{output} = \text{input1}_{dz} + \text{input1\_g}$$

It is worth mentioning that the pixel value of the banding region in $input1_{dz}$ is enlarged, while the pixel value in input1_g remains the same as that before banding removal. In this way, after the superposition of the second low-frequency image and the first high-frequency image, it is equivalent to reducing a proportion of high-frequency details in output, thus achieving the purpose of noise reduction in the banding region. In addition, the high-frequency and low-frequency noise reduction method only works on a banding region in the non-dark region, and may not affect definition of a non-banding region in the image, so that adaptive noise suppression in the banding region can be realized.

It should be noted that in practical application, the low-frequency image input1_d is a single channel image in the RAW domain, and may be in a specific Bayer format, for example, GBRG, RGGB, BGGR, or the like. In the stroboscopic image processing method provided in this embodiment of this application, a RAW domain image in a GBRG format is used as an example for description. However, during implementation, the stroboscopic image processing method provided in this embodiment of this application can also be applied to RAW domain images in other formats such as RGGB and BGGR, and the target mask can be obtained in a processing process similar to that of the RAW domain image in the GBRG format, which is not specifically limited herein.

In this embodiment of this application, when a first image with banding is photographed under a stroboscopic light source, the image may be divided into a high-frequency image and a low-frequency image, and banding in the first low-frequency image is filtered based on the target mask. In the filtering process, debanding intensity on a black region and a shadow region of a raw image can be reduced by adjusting the mask value of the target mask, thereby reducing noise exposure in the black region and the shadow region of the raw image caused in a debanding process, and reducing loss of raw image quality. In addition, because the RAW domain value of the banding region is increased during the debanding process, the RAW domain value of the banding region in the second low-frequency image is relatively increased, that is, the RAW domain value of the banding region in the high-frequency image is relatively reduced. In this way, when the second low-frequency image with the increased RAW domain value in the banding region is superimposed with the high-frequency image with the unchanged RAW domain value in the banding region, a proportion of the high-frequency image in the banding region may be reduced, so that a final output image can not only maintain definition of a non-banding region by using the high-frequency image, but also maintain debanding effect of the banding region by using the low-frequency image obtained after debanding, to change ratios of high-frequency information and low-frequency information based on the banding intensity, and achieve the purpose of adaptive noise reduction.

Figure 5:
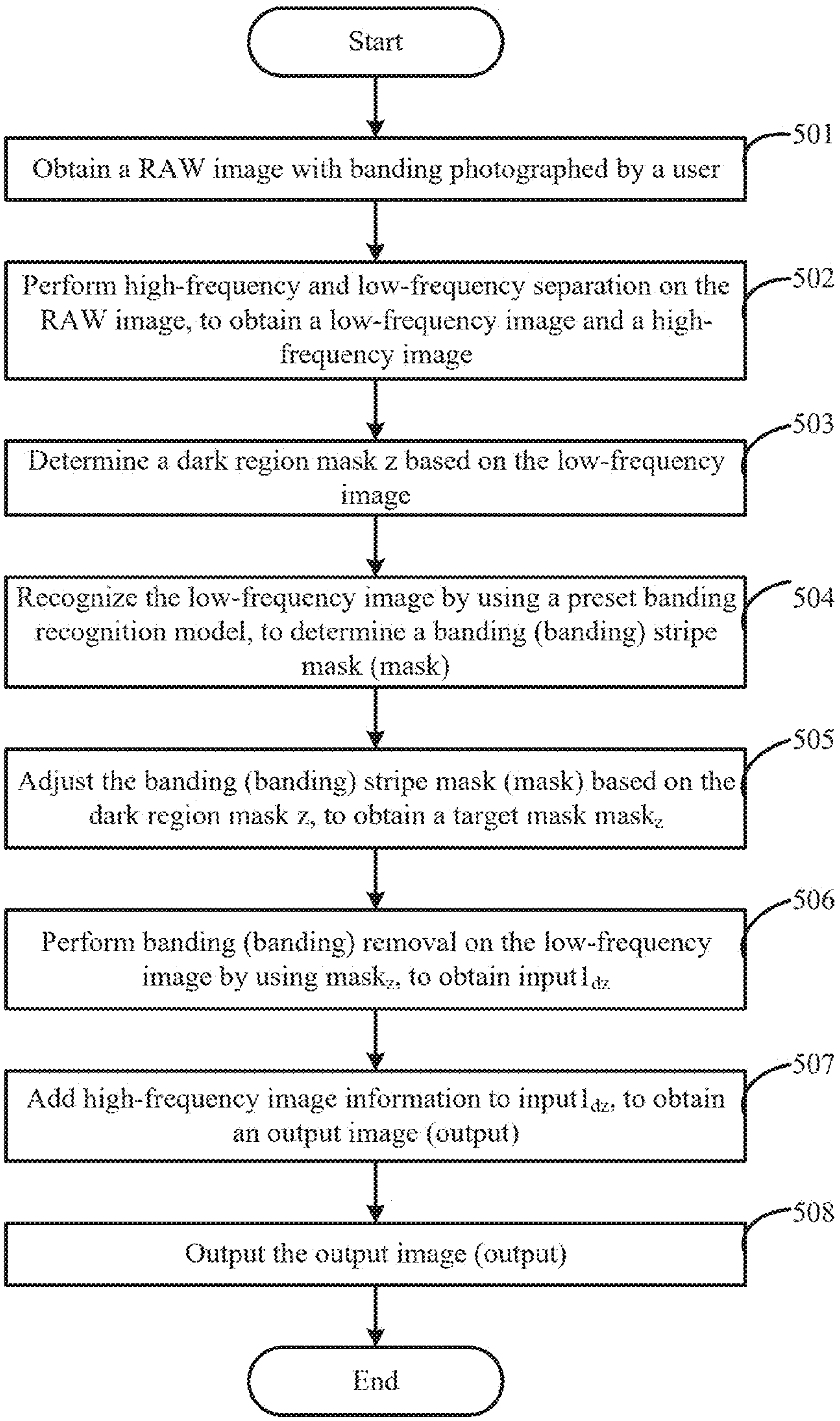
FIG. 5 is a flowchart of another stroboscopic image processing method according to an embodiment of this application.

FIG. 5 shows another stroboscopic image processing method according to an embodiment of this application. As shown in FIG. 5, the method may include the following steps.

Step 501: Obtain a RAW image with banding photographed by a user.

Step 502: Perform high-frequency and low-frequency separation on the RAW image, to obtain a low-frequency image and a high-frequency image.

Step 503: Determine a dark region mask z based on the low-frequency image.

Step 504: Recognize the low-frequency image by using a preset banding recognition model, to determine a banding stripe mask.

Step 505: Adjust the banding stripe mask based on the dark region mask z, to obtain a target mask $mask_z$.

Step 506: Perform banding removal on the low-frequency image by using $mask_z$, to obtain $input1_{dz}$.

Step 507: Add high-frequency image information to $input1_{dz}$, to obtain an output image output.

Step 508: Output the output image output.

In this embodiment of this application, through high-frequency image and low-frequency image separation, noise in a banding region can be suppressed after debanding, and negative influence of image detail attributes on a debanding algorithm can be avoided in a process of determining a banding region based on the low-frequency image, so that a predicted stroboscopic region is smoother and more uniform. In addition, based on a dark region of a raw image, a smooth dark region mask is output, and a removal degree of the dark region is automatically controlled by performing banding removal on a mask region predicted by a network, so that raw image quality is preserved, and the noise is reduced. The whole process can be realized in a camera link, to automatically remove banding and photograph clear photos when the user takes pictures.

The stroboscopic image processing method provided in this embodiment of this application may be executed by a stroboscopic image processing apparatus. In the embodiments of this application, a stroboscopic image processing apparatus provided in the embodiments of this application is described by using an example in which the stroboscopic image processing method is performed by the stroboscopic image processing apparatus.

Figure 6:
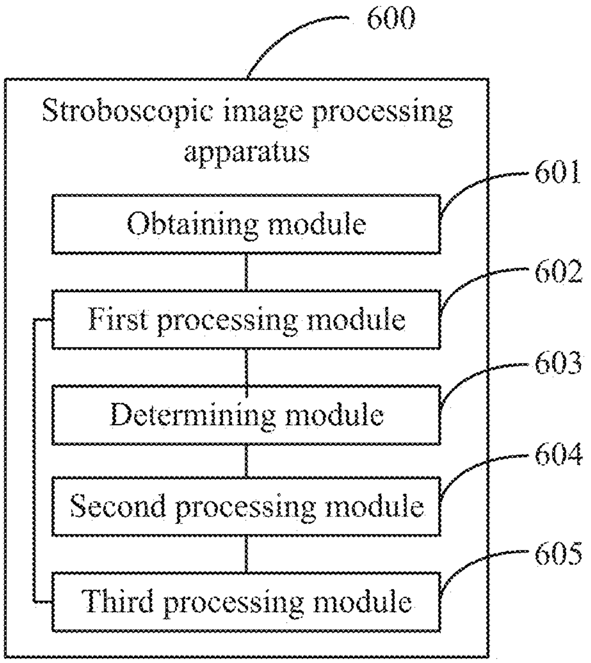
FIG. 6 is a schematic diagram of a structure of a stroboscopic image processing apparatus according to an embodiment of this application.

Refer to FIG. 6, the stroboscopic image processing apparatus 600 provided in this embodiment of this application may include the following modules:

an obtaining module 601, configured to obtain a first image photographed under a stroboscopic light source, where the first image includes banding, and the first image is a raw RAW domain image;

a first processing module 602, configured to perform high-frequency image and low-frequency image separation on the first image, to obtain a first high-frequency image and a first low-frequency image;

a determining module 603, configured to determine a target mask based on the first low-frequency image, where a mask value in the target mask is negatively correlated with brightness and banding strength of a region corresponding to the mask value in the first low-frequency image;

a second processing module 604, configured to filter banding in the first low-frequency image based on the target mask, to obtain a second low-frequency image, where a RAW domain value located in a first region of the second low-frequency image is greater than a RAW domain value located in a second region of the first low-frequency image, the first region includes a region in which banding is located and does not include a region in which a dark region is located, the dark region is a region with a brightness value less than a preset brightness threshold, and the first region corresponds to the second region; and a third processing module 605, configured to superpose the second low-frequency image and the first high-frequency image, to obtain an output image.

Optionally, the first processing module 602 includes:

a first processing module, configured to perform mean filtering processing on the first image, to obtain the first low-frequency image; and a second processing module, configured to perform image removal processing on the first image based on the first low-frequency image, to obtain the first high-frequency image.

Optionally, the first image includes a first sub-image and a second sub-image, the first sub-image is obtained through photographing based on a first shutter frequency, the second sub-image is obtained through photographing based on a second shutter frequency, the first shutter frequency is related to a moving speed of a photographed object, and the second shutter frequency is related to a flash frequency of the stroboscopic light source; and the first processing module 602 includes:

a third processing module, configured to perform high-frequency image and low-frequency image separation on the first sub-image, to obtain a first high-frequency sub-image and a first low-frequency sub-image; and a fourth processing module, configured to perform high-frequency image and low-frequency image separation on the second sub-image, to obtain a second high-frequency sub-image and a second low-frequency sub-image, where the first high-frequency image includes the first high-frequency sub-image and the second high-frequency sub-image, and the first low-frequency image includes the first low-frequency sub-image and the second low-frequency sub-image.

Optionally, the determining module 603 includes:

a first determining unit, configured to determine, based on a RAW image obtained after four types of data in the first low-frequency sub-image are stacked on channels, an average RAW image corresponding to the first low-frequency sub-image, where the average RAW image includes G channel data obtained after average value processing, B channel data obtained after average value processing, and R channel data obtained after average value processing, and the G channel data is determined based on an average value of Gr channel data and Gb channel data in the first low-frequency sub-image;

a fifth processing module, configured to normalize the average RAW image based on a black level value and a maximum number of bits of the average RAW image, to obtain a normalized RAW image;

a second determining unit, configured to determine a first mask based on a region in which a pixel value in the normalized RAW image is less than or equal to a first preset threshold, where a smaller mask value in the first mask indicates lower brightness of a corresponding region;

a sixth processing module, configured to splice the first low-frequency sub-image and the second low-frequency sub-image on a channel, to obtain an intermediate image;

a seventh processing module, configured to input the intermediate image into a preset banding recognition model, to obtain a second mask, where a smaller mask value in the second mask indicates heavier banding of a corresponding region; and an adjusting unit, configured to adjust the second mask based on the first mask, to obtain the target mask.

Optionally, the adjusting unit is specifically configured to:

reduce, based on the first mask, a mask value corresponding to a target region in the second mask, to obtain the target mask, where a mask value corresponding to the target region in the first mask is less than or equal to a second preset threshold, and a mask value corresponding to the target region in the second mask is less than or equal to a third preset threshold.

Optionally, the determining module 603 includes:

a first obtaining unit, configured to obtain a first mask value corresponding to a Gr data channel in the second mask;

a second obtaining unit, configured to obtain a second mask value corresponding to a Gb data channel in the second mask; and an updating unit, configured to update, based on an average value of the first mask value and the second mask value, the mask values corresponding to the Gr data channel and the Gb data channel in the second mask; and the adjusting unit is specifically configured to:

adjust the updated second mask based on the first mask, to obtain the target mask.

The stroboscopic image processing apparatus in this embodiment of this application may be an electronic device, or may be a component such as an integrated circuit or a chip in the electronic device. The electronic device may be a terminal, or another device other than the terminal. For example, the electronic device may be a mobile phone, a tablet computer, a notebook computer, a palmtop computer, an in-vehicle electronic device, a mobile Internet device (MID), an augmented reality (AR)/virtual reality (VR) device, a robot, a wearable device, an ultra-mobile personal computer (UMPC), a netbook, a personal digital assistant (PDA), or the like. The electronic device may be alternatively a server, a network attached storage (NAS), a personal computer (PC), a television (TV), a teller machine, a self-service machine, or the like. This is not specifically limited in this embodiment of this application.

The stroboscopic image processing apparatus in this embodiment of this application may be an apparatus with an operating system. The operating system may be an Android operating system, may be an iOS operating system, or may be another possible operating system. This is not specifically limited in this embodiment of this application.

The stroboscopic image processing apparatus provided in this embodiment of this application can implement the processes for implementing the method embodiments shown in FIG. 1 to FIG. 5, and can achieve the same beneficial effect. To avoid repetition, details are not described herein again.

Figure 7:
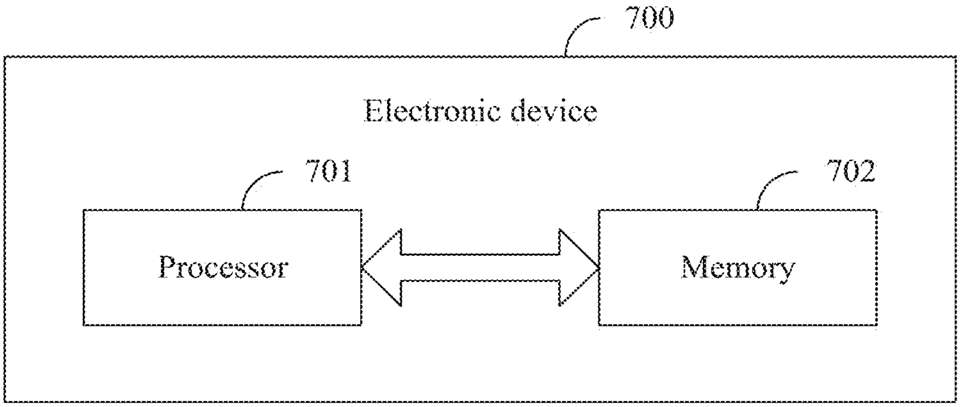
FIG. 7 is a schematic diagram of a structure of an electronic device according to an embodiment of this application.

Optionally, as shown in FIG. 7, an embodiment of this application further provides an electronic device 700, including a processor 701 and a memory 702, and the memory 702 stores a program or an instruction that can be run on the processor 701. When the program or the instruction is executed by the processor 701, the steps of the stroboscopic image processing method embodiment are implemented, and a same technical effect can be achieved. To avoid repetition, details are not described herein again.

It should be noted that the electronic device in this embodiment of this application includes the mobile electronic device and the non-mobile electronic device.

Figure 8:
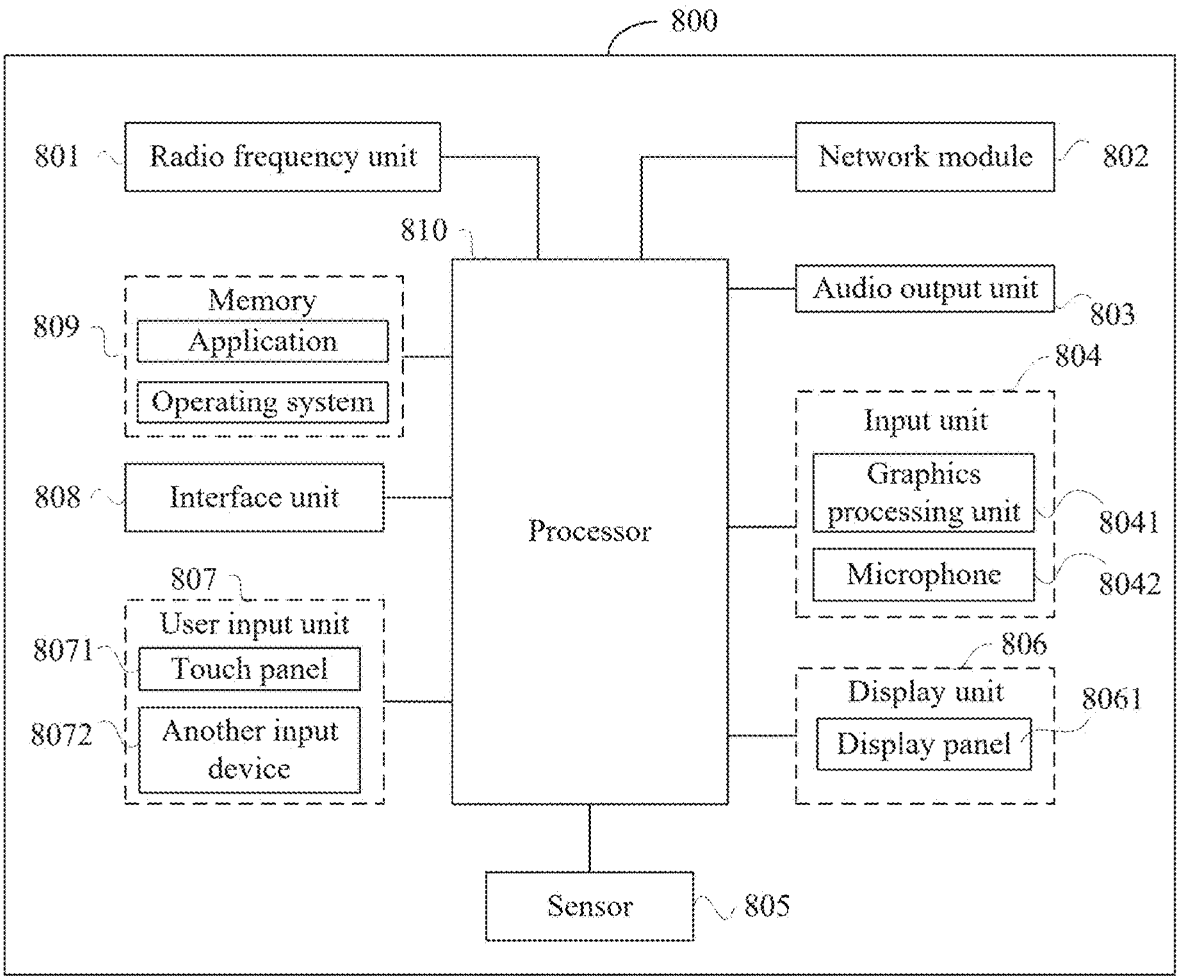
FIG. 8 is a schematic diagram of a hardware structure of an electronic device according to an embodiment of this application.

FIG. 8 is a schematic diagram of a hardware structure of an electronic device according to an embodiment of this application.

The electronic device 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the electronic device 800 may further include the power supply (for example, a battery) that supplies power to each component. The power supply may be logically connected to the processor 810 by using a power supply management system, so as to manage functions such as charging, discharging, and power consumption by using the power supply management system. The structure of the electronic device shown in FIG. 8 does not constitute a limitation on the electronic device, and the electronic device may include more or fewer components than those shown in the figure, or combine some components, or have different component arrangements. Details are not described herein again.

The input unit 804 is configured to obtain a first image photographed under a stroboscopic light source, where the first image includes banding, and the first image is a raw RAW domain image.

The processor 810 is configured to perform high-frequency image and low-frequency image separation on the first image, to obtain a first high-frequency image and a first low-frequency image.

The processor 810 is further configured to determine a target mask based on the first low-frequency image, where a mask value in the target mask is negatively correlated with brightness and banding strength of a region corresponding to the mask value in the first low-frequency image.

The processor 810 is further configured to filter banding in the first low-frequency image based on the target mask, to obtain a second low-frequency image, where a RAW domain value located in a first region of the second low-frequency image is greater than a RAW domain value located in a second region of the first low-frequency image, the first region includes a region in which banding is located and does not include a region in which a dark region is located, the dark region is a region with a brightness value less than a preset brightness threshold, and the first region corresponds to the second region.

The processor 810 is further configured to superpose the second low-frequency image and the first high-frequency image, to obtain an output image.

Optionally, the performing high-frequency image and low-frequency image separation on the first image, to obtain a first high-frequency image and a first low-frequency image executed by the processor 810 includes:

performing mean filtering processing on the first image, to obtain the first low-frequency image; and performing image removal processing on the first image based on the first low-frequency image, to obtain the first high-frequency image.

Optionally, the first image includes a first sub-image and a second sub-image, the first sub-image is obtained through photographing based on a first shutter frequency, the second sub-image is obtained through photographing based on a second shutter frequency, the first shutter frequency is related to a moving speed of a photographed object, and the second shutter frequency is related to a flash frequency of the stroboscopic light source; and the performing high-frequency image and low-frequency image separation on the first image, to obtain a first high-frequency image and a first low-frequency image executed by the processor 810 includes:

performing high-frequency image and low-frequency image separation on the first sub-image, to obtain a first high-frequency sub-image and a first low-frequency sub-image; and performing high-frequency image and low-frequency image separation on the second sub-image, to obtain a second high-frequency sub-image and a second low-frequency sub-image, where the first high-frequency image includes the first high-frequency sub-image and the second high-frequency sub-image, and the first low-frequency image includes the first low-frequency sub-image and the second low-frequency sub-image.

Optionally, the determining a target mask based on the first low-frequency image executed by the processor 810 includes:

determining, based on a RAW image obtained after four types of data in the first low-frequency sub-image are stacked on channels, an average RAW image corresponding to the first low-frequency sub-image, where the average RAW image includes G channel data obtained after average value processing, B channel data obtained after average value processing, and R channel data obtained after average value processing, and the G channel data is determined based on an average value of Gr channel data and Gb channel data in the first low-frequency sub-image;

normalizing the average RAW image based on a black level value and a maximum number of bits of the average RAW image, to obtain a normalized RAW image;

determining a first mask based on a region in which a pixel value in the normalized RAW image is less than or equal to a first preset threshold, where a smaller mask value in the first mask indicates lower brightness of a corresponding region;

splicing the first low-frequency sub-image and the second low-frequency sub-image on a channel, to obtain an intermediate image;

inputting the intermediate image into a preset banding recognition model, to obtain a second mask, where a smaller mask value in the second mask indicates heavier banding of a corresponding region; and adjusting the second mask based on the first mask, to obtain the target mask.

Optionally, the adjusting the second mask based on the first mask, to obtain the target mask executed by the processor 810 includes:

reducing, based on the first mask, a mask value corresponding to a target region in the second mask, to obtain the target mask, where a mask value corresponding to the target region in the first mask is less than or equal to a second preset threshold, and a mask value corresponding to the target region in the second mask is less than or equal to a third preset threshold.

Optionally, the determining a target mask based on the first low-frequency image executed by the processor 810 further includes:

obtaining a first mask value corresponding to a Gr data channel in the second mask;

obtaining a second mask value corresponding to a Gb data channel in the second mask; and updating, based on an average value of the first mask value and the second mask value, the mask values corresponding to the Gr data channel and the Gb data channel in the second mask; and the adjusting the second mask based on the first mask, to obtain the target mask includes:

adjusting the updated second mask based on the first mask, to obtain the target mask.

The electronic device 800 provided in this embodiment of this application can implement processes performed by modules in the stroboscopic image processing apparatus shown in FIG. 6, and a same beneficial effect can be achieved. To avoid repetition, details are not described herein again.

It should be understood that in this embodiment of this application, the input unit 804 may include a graphics processing unit (GPU) 8041 and a microphone 8042. The graphics processing unit 8041 processes image data of a static picture or a video obtained by an image capture apparatus (for example, a camera) in a video capture mode or an image capture mode. The display unit 806 may include a display panel 8061, and the display panel 8061 may be configured in a form of a liquid crystal display, an organic light-emitting diode, or the like. The user input unit 807 includes at least one of a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein.

The memory 809 may be configured to store a software program and various data. The memory 809 may mainly include a first storage area for storing a program or an instruction and a second storage area for storing data. The first storage area may store an operating system, and an application or an instruction required by at least one function (for example, a sound playing function or an image playing function). In addition, the memory 809 may be a volatile memory or a non-volatile memory, or the memory 809 may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (Enhanced SDRAM, ESDRAM), a synchlink dynamic random access memory (SLDRAM), and a direct rambus random access memory (DRRAM). The memory 809 in this embodiment of this application includes but is not limited to these memories and any memory of another proper type.

The processor 810 may include one or more processing units. Optionally, an application processor and a modem processor are integrated into the processor 810. The application processor mainly processes an operating system, a user interface, an application, or the like. The modem processor mainly processes a wireless communication signal, for example, a baseband processor. It may be understood that, alternatively, the modem processor may not be integrated into the processor 810.

An embodiment of this application further provides a readable storage medium. The readable storage medium stores a program or an instruction, and the program or the instruction is executed by a processor to implement the processes of the stroboscopic image processing method embodiment, and a same technical effect can be achieved. To avoid repetition, details are not described herein again.

The processor is a processor in the electronic device in the foregoing embodiment. The readable storage medium includes a computer-readable storage medium, such as a computer read-only memory ROM, a random access memory RAM, a magnetic disk, or an optical disc.

An embodiment of this application further provides a chip. The chip includes a processor and a communication interface, the communication interface is coupled to the processor, and the processor is configured to run a program or an instruction to implement the processes of the stroboscopic image processing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The program product is stored in a storage medium, and the program product is executed by at least one processor to implement the processes of the stroboscopic image processing method embodiment, and a same technical effect can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing an electronic device (which may be a mobile phone, a computer, a server, a network device, or the like) to perform the method described in the embodiments of this application.

The embodiments of this application are described above with reference to the accompanying drawings, but this application is not limited to the foregoing specific implementations, and the foregoing specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A stroboscopic image processing method, comprising:

obtaining a first image photographed under a stroboscopic light source, wherein the first image comprises banding, and the first image is a raw RAW domain image;

performing high-frequency image and low-frequency image separation on the first image, to obtain a first high-frequency image and a first low-frequency image;

determining a target mask based on the first low-frequency image, wherein a mask value in the target mask is negatively correlated with brightness and banding strength of a region corresponding to the mask value in the first low-frequency image;

filtering banding in the first low-frequency image based on the target mask, to obtain a second low-frequency image, wherein a RAW domain value located in a first region of the second low-frequency image is greater than a RAW domain value located in a second region of the first low-frequency image, the first region comprises a region in which banding is located and does not comprise a region in which a dark region is located, the dark region is a region with a brightness value less than a preset brightness threshold, and the first region corresponds to the second region; and superposing the second low-frequency image and the first high-frequency image, to obtain an output image.

2. The method according to claim 1, wherein the performing high-frequency image and low-frequency image separation on the first image, to obtain a first high-frequency image and a first low-frequency image comprises:

performing mean filtering processing on the first image, to obtain the first low-frequency image; and performing image removal processing on the first image based on the first low-frequency image, to obtain the first high-frequency image.

3. The method according to claim 1, wherein the first image comprises a first sub-image and a second sub-image, the first sub-image is obtained through photographing based on a first shutter frequency, the second sub-image is obtained through photographing based on a second shutter frequency, the first shutter frequency is related to a moving speed of a photographed object, and the second shutter frequency is related to a flash frequency of the stroboscopic light source; and the performing high-frequency image and low-frequency image separation on the first image, to obtain a first high-frequency image and a first low-frequency image comprises:

performing high-frequency image and low-frequency image separation on the first sub-image, to obtain a first high-frequency sub-image and a first low-frequency sub-image; and performing high-frequency image and low-frequency image separation on the second sub-image, to obtain a second high-frequency sub-image and a second low-frequency sub-image, wherein the first high-frequency image comprises the first high-frequency sub-image and the second high-frequency sub-image, and the first low-frequency image comprises the first low-frequency sub-image and the second low-frequency sub-image.

4. The method according to claim 3, wherein the determining a target mask based on the first low-frequency image comprises:

determining, based on a RAW image obtained after four types of data in the first low-frequency sub-image are stacked on channels, an average RAW image corresponding to the first low-frequency sub-image, wherein the average RAW image comprises G channel data obtained after average value processing, B channel data obtained after average value processing, and R channel data obtained after average value processing, and the G channel data is determined based on an average value of Gr channel data and Gb channel data in the first low-frequency sub-image;

normalizing the average RAW image based on a black level value and a maximum number of bits of the average RAW image, to obtain a normalized RAW image;

determining a first mask based on a region in which a pixel value in the normalized RAW image is less than or equal to a first preset threshold, wherein a smaller mask value in the first mask indicates lower brightness of a corresponding region;

splicing the first low-frequency sub-image and the second low-frequency sub-image on a channel, to obtain an intermediate image;

inputting the intermediate image into a preset banding recognition model, to obtain a second mask, wherein a smaller mask value in the second mask indicates heavier banding of a corresponding region; and adjusting the second mask based on the first mask, to obtain the target mask.

5. The method according to claim 4, wherein the adjusting the second mask based on the first mask, to obtain the target mask comprises:

reducing, based on the first mask, a mask value corresponding to a target region in the second mask, to obtain the target mask, wherein a mask value corresponding to the target region in the first mask is less than or equal to a second preset threshold, and a mask value corresponding to the target region in the second mask is less than or equal to a third preset threshold.

6. The method according to claim 4, wherein the determining a target mask based on the first low-frequency image further comprises:

obtaining a first mask value corresponding to a Gr data channel in the second mask;

obtaining a second mask value corresponding to a Gb data channel in the second mask; and updating, based on an average value of the first mask value and the second mask value, the mask values corresponding to the Gr data channel and the Gb data channel in the second mask; and the adjusting the second mask based on the first mask, to obtain the target mask comprises:

adjusting the updated second mask based on the first mask, to obtain the target mask.

7. A chip, comprising a processor and a communication interface, wherein the communication interface is coupled to the processor, and the processor is configured to run a program or an instruction to implement the steps of the stroboscopic image processing method according to claim 1.

8. A computer program product, wherein the program product is stored in a non-transient storage medium, and the program product is executed by at least one processor to implement the steps of the stroboscopic image processing method according to claim 1.

9. An electronic device, comprising a processor and a memory, wherein the memory stores a program or an instruction that can be run on the processor, wherein the program or the instruction, when executed by the processor, causes the electronic device to perform:

obtaining a first image photographed under a stroboscopic light source, wherein the first image comprises banding, and the first image is a raw RAW domain image;

performing high-frequency image and low-frequency image separation on the first image, to obtain a first high-frequency image and a first low-frequency image;

determining a target mask based on the first low-frequency image, wherein a mask value in the target mask is negatively correlated with brightness and banding strength of a region corresponding to the mask value in the first low-frequency image;

filtering banding in the first low-frequency image based on the target mask, to obtain a second low-frequency image, wherein a RAW domain value located in a first region of the second low-frequency image is greater than a RAW domain value located in a second region of the first low-frequency image, the first region comprises a region in which banding is located and does not comprise a region in which a dark region is located, the dark region is a region with a brightness value less than a preset brightness threshold, and the first region corresponds to the second region; and superposing the second low-frequency image and the first high-frequency image, to obtain an output image.

10. The electronic device according to claim 9, wherein when performing high-frequency image and low-frequency image separation on the first image, to obtain a first high-frequency image and a first low-frequency image, the program or the instruction, when executed by the processor, causes the electronic device to perform:

performing mean filtering processing on the first image, to obtain the first low-frequency image; and performing image removal processing on the first image based on the first low-frequency image, to obtain the first high-frequency image.

11. The electronic device according to claim 9, wherein the first image comprises a first sub-image and a second sub-image, the first sub-image is obtained through photographing based on a first shutter frequency, the second sub-image is obtained through photographing based on a second shutter frequency, the first shutter frequency is related to a moving speed of a photographed object, and the second shutter frequency is related to a flash frequency of the stroboscopic light source; and when performing high-frequency image and low-frequency image separation on the first image, to obtain a first high-frequency image and a first low-frequency image, the program or the instruction, when executed by the processor, causes the electronic device to perform:

performing high-frequency image and low-frequency image separation on the first sub-image, to obtain a first high-frequency sub-image and a first low-frequency sub-image; and performing high-frequency image and low-frequency image separation on the second sub-image, to obtain a second high-frequency sub-image and a second low-frequency sub-image, wherein the first high-frequency image comprises the first high-frequency sub-image and the second high-frequency sub-image, and the first low-frequency image comprises the first low-frequency sub-image and the second low-frequency sub-image.

12. The electronic device according to claim 11, wherein when determining a target mask based on the first low-frequency image, the program or the instruction, when executed by the processor, causes the electronic device to perform:

determining, based on a RAW image obtained after four types of data in the first low-frequency sub-image are stacked on channels, an average RAW image corresponding to the first low-frequency sub-image, wherein the average RAW image comprises G channel data obtained after average value processing, B channel data obtained after average value processing, and R channel data obtained after average value processing, and the G channel data is determined based on an average value of Gr channel data and Gb channel data in the first low-frequency sub-image;

normalizing the average RAW image based on a black level value and a maximum number of bits of the average RAW image, to obtain a normalized RAW image;

determining a first mask based on a region in which a pixel value in the normalized RAW image is less than or equal to a first preset threshold, wherein a smaller mask value in the first mask indicates lower brightness of a corresponding region;

splicing the first low-frequency sub-image and the second low-frequency sub-image on a channel, to obtain an intermediate image;

inputting the intermediate image into a preset banding recognition model, to obtain a second mask, wherein a smaller mask value in the second mask indicates heavier banding of a corresponding region; and adjusting the second mask based on the first mask, to obtain the target mask.

13. The electronic device according to claim 12, wherein when adjusting the second mask based on the first mask, to obtain the target mask, the program or the instruction, when executed by the processor, causes the electronic device to perform:

reducing, based on the first mask, a mask value corresponding to a target region in the second mask, to obtain the target mask, wherein a mask value corresponding to the target region in the first mask is less than or equal to a second preset threshold, and a mask value corresponding to the target region in the second mask is less than or equal to a third preset threshold.

14. The electronic device according to claim 12, wherein when determining a target mask based on the first low-frequency image, the program or the instruction, when executed by the processor, causes the electronic device to further perform:

obtaining a first mask value corresponding to a Gr data channel in the second mask;

obtaining a second mask value corresponding to a Gb data channel in the second mask; and updating, based on an average value of the first mask value and the second mask value, the mask values corresponding to the Gr data channel and the Gb data channel in the second mask; and the adjusting the second mask based on the first mask, to obtain the target mask comprises:

adjusting the updated second mask based on the first mask, to obtain the target mask.

15. A non-transitory readable storage medium, wherein the readable storage medium stores a program or an instruction, wherein the program or the instruction, when executed by a processor of an electronic device, causes the electronic device to perform:

obtaining a first image photographed under a stroboscopic light source, wherein the first image comprises banding, and the first image is a raw RAW domain image;

performing high-frequency image and low-frequency image separation on the first image, to obtain a first high-frequency image and a first low-frequency image;

determining a target mask based on the first low-frequency image, wherein a mask value in the target mask is negatively correlated with brightness and banding strength of a region corresponding to the mask value in the first low-frequency image;

filtering banding in the first low-frequency image based on the target mask, to obtain a second low-frequency image, wherein a RAW domain value located in a first region of the second low-frequency image is greater than a RAW domain value located in a second region of the first low-frequency image, the first region comprises a region in which banding is located and does not comprise a region in which a dark region is located, the dark region is a region with a brightness value less than a preset brightness threshold, and the first region corresponds to the second region; and superposing the second low-frequency image and the first high-frequency image, to obtain an output image.

16. The non-transitory readable storage medium according to claim 15, wherein when performing high-frequency image and low-frequency image separation on the first image, to obtain a first high-frequency image and a first low-frequency image, the program or the instruction, when executed by the processor of the electronic device, causes the electronic device to perform:

performing mean filtering processing on the first image, to obtain the first low-frequency image; and performing image removal processing on the first image based on the first low-frequency image, to obtain the first high-frequency image.

17. The non-transitory readable storage medium according to claim 15, wherein the first image comprises a first sub-image and a second sub-image, the first sub-image is obtained through photographing based on a first shutter frequency, the second sub-image is obtained through photographing based on a second shutter frequency, the first shutter frequency is related to a moving speed of a photographed object, and the second shutter frequency is related to a flash frequency of the stroboscopic light source; and when performing high-frequency image and low-frequency image separation on the first image, to obtain a first high-frequency image and a first low-frequency image, the program or the instruction, when executed by the processor of the electronic device, causes the electronic device to perform:

performing high-frequency image and low-frequency image separation on the first sub-image, to obtain a first high-frequency sub-image and a first low-frequency sub-image; and performing high-frequency image and low-frequency image separation on the second sub-image, to obtain a second high-frequency sub-image and a second low-frequency sub-image, wherein the first high-frequency image comprises the first high-frequency sub-image and the second high-frequency sub-image, and the first low-frequency image comprises the first low-frequency sub-image and the second low-frequency sub-image.

18. The non-transitory readable storage medium according to claim 17, wherein when determining a target mask based on the first low-frequency image, the program or the instruction, when executed by the processor of the electronic device, causes the electronic device to perform:

determining, based on a RAW image obtained after four types of data in the first low-frequency sub-image are stacked on channels, an average RAW image corresponding to the first low-frequency sub-image, wherein the average RAW image comprises G channel data obtained after average value processing, B channel data obtained after average value processing, and R channel data obtained after average value processing, and the G channel data is determined based on an average value of Gr channel data and Gb channel data in the first low-frequency sub-image;

normalizing the average RAW image based on a black level value and a maximum number of bits of the average RAW image, to obtain a normalized RAW image;

determining a first mask based on a region in which a pixel value in the normalized RAW image is less than or equal to a first preset threshold, wherein a smaller mask value in the first mask indicates lower brightness of a corresponding region;

splicing the first low-frequency sub-image and the second low-frequency sub-image on a channel, to obtain an intermediate image;

inputting the intermediate image into a preset banding recognition model, to obtain a second mask, wherein a smaller mask value in the second mask indicates heavier banding of a corresponding region; and adjusting the second mask based on the first mask, to obtain the target mask.

19. The non-transitory readable storage medium according to claim 18, wherein when adjusting the second mask based on the first mask, to obtain the target mask, the program or the instruction, when executed by the processor of the electronic device, causes the electronic device to perform:

reducing, based on the first mask, a mask value corresponding to a target region in the second mask, to obtain the target mask, wherein a mask value corresponding to the target region in the first mask is less than or equal to a second preset threshold, and a mask value corresponding to the target region in the second mask is less than or equal to a third preset threshold.

20. The non-transitory readable storage medium according to claim 18, wherein when determining a target mask based on the first low-frequency image, the program or the instruction, when executed by the processor of the electronic device, causes the electronic device to further perform:

obtaining a first mask value corresponding to a Gr data channel in the second mask;

obtaining a second mask value corresponding to a Gb data channel in the second mask; and updating, based on an average value of the first mask value and the second mask value, the mask values corresponding to the Gr data channel and the Gb data channel in the second mask; and the adjusting the second mask based on the first mask, to obtain the target mask comprises:

adjusting the updated second mask based on the first mask, to obtain the target mask.

* * * * *